United States Patent
Venkataraman et al.

(10) Patent No.: US 12,363,616 B2
(45) Date of Patent: Jul. 15, 2025

(54) ENHANCEMENTS FOR HANDLING NETWORK SLICE QUOTA

(71) Applicant: Apple Inc., Cupertino, CA (US)

(72) Inventors: Vijay Venkataraman, San Jose, CA (US); Alosious Pradeep Prabhakar, Singapore (SG); Krisztian Kiss, Hayward, CA (US)

(73) Assignee: Apple Inc., Cupertino, CA (US)

( * ) Notice: Subject to any disclaimer, the term of this patent is extended or adjusted under 35 U.S.C. 154(b) by 573 days.

(21) Appl. No.: 17/313,702

(22) Filed: May 6, 2021

(65) Prior Publication Data

US 2021/0368421 A1 Nov. 25, 2021

Related U.S. Application Data

(60) Provisional application No. 63/028,409, filed on May 21, 2020.

(51) Int. Cl.
*H04W 48/06* (2009.01)
*H04W 12/06* (2021.01)
(Continued)

(52) U.S. Cl.
CPC .......... *H04W 48/06* (2013.01); *H04W 12/06* (2013.01); *H04W 60/04* (2013.01); *H04W 60/06* (2013.01); *H04W 76/10* (2018.02)

(58) Field of Classification Search
CPC . H04W 48/06; H04W 12/06; H04W 28/0289; H04W 60/06; H04W 76/10;
(Continued)

(56) References Cited

U.S. PATENT DOCUMENTS

| 10,362,511 B2 | 7/2019 | Youn et al. |
| 2019/0182875 A1 | 6/2019 | Talebi |
| (Continued) | | |

FOREIGN PATENT DOCUMENTS

| CN | 111669719 A | 9/2020 |
| KR | 20190004217 | 1/2019 |

OTHER PUBLICATIONS

Office Action Chinese Patent Application No. 202110555835.3; Feb. 27, 2024.
(Continued)

*Primary Examiner* — Ashley Shivers
(74) *Attorney, Agent, or Firm* — Kowert, Hood, Munyon, Rankin & Goetzel, P.C.

(57) ABSTRACT

A Public Land Mobile Network includes a network slice quota (NSQ) node to implement a quota on the number of user equipments (UEs) or (UE, PDU_Session) pairs that may be registered on a network slice. An access and mobility management function (AMF) queries the NSQ on whether quota is available for registration of a UE on a network slice in response to a notification of successful authorization and/or authentication (AAA) of the UE. Alternatively, the AMF may preemptively capture one or more units of network slice quota for the UE prior to initiation of the AAA procedure. The AMF may start a timer after UE deregistration is initiated, and not relinquish the quota unit held by the UE until after the timer's expiration. The network may also include a session management function (SMF) that provides UE identification as well as PDU Session ID when requesting registration of a UE.

20 Claims, 15 Drawing Sheets

(51) Int. Cl.
*H04W 28/02* (2009.01)
*H04W 60/04* (2009.01)
*H04W 60/06* (2009.01)
*H04W 76/10* (2018.01)

(58) Field of Classification Search
CPC ..... H04W 76/12; H04W 24/02; H04W 60/04; H04W 76/11; H04W 36/0011; H04W 36/0066; H04W 48/08; H04L 63/0892
See application file for complete search history.

(56) References Cited

U.S. PATENT DOCUMENTS

| | | | |
|---|---|---|---|
| 2020/0154350 A1 | 5/2020 | Dao et al. | |
| 2020/0245381 A1 | 7/2020 | Talebi Fard et al. | |
| 2020/0245405 A1* | 7/2020 | Tang | H04M 15/8228 |
| 2020/0389843 A1* | 12/2020 | Huang | H04W 8/08 |
| 2021/0029590 A1* | 1/2021 | Ying | H04W 8/08 |
| 2022/0248318 A1* | 8/2022 | Qiao | H04W 76/18 |
| 2022/0369155 A1* | 11/2022 | Hedman | H04W 28/18 |

OTHER PUBLICATIONS

Nokia et al. "Solution on KI#2: PCF-based counting of PDU Sessions in a Network Slice"; SA WG2 Meeting #136 S2-1911238; Jan. 18, 2019.
Tencent "Registration Procedure Update for Trusted non-3GPP access"; SA WG2 Meeting #132 S2-1903218; Apr. 8, 2019.
Vivo "Solution for UE number and PDU session number monitoring"; SA WG2 Meeting #136 S2-1911422; Nov. 18, 2019.

\* cited by examiner

750

```
initiate a process of authenticating and/or authorizing a first user
equipment (UE) to use a network slice of the network    755
```

```
in response to receiving an indication that the process has
successfully authenticated and/or authorized the first UE to use the
network slice, sending a query message to a network slice quota
node, wherein the query message represents an inquiry on whether
there is available quota for an addition of the first UE to a number of
user equipments using the network slice    760
```

```
in response to receiving a positive response to the query message,
sending a quota update message that requests the network slice
quota node to update the available quota    765
```

```
in response to receiving a confirmation message that the available
quota has been updated, sending a registration accept message to
the first UE, indicating that the first UE is authorized to use the
network slice    770
```

```
in response to receiving, from a user equipment (UE), a request for
registration to use a network slice, send a query message to a
network slice quota (NSQ) node, wherein the query message
represents an inquiry on whether there is available quota for an
addition of the UE to a number of user equipments using the network
slice   789
```

```
in response to receiving, from the NSQ node, a positive response to
the query message, preemptively claim a unit of network slice quota
for the UE prior to initiation of a procedure to authenticate and/or
authorize the UE to use the network slice   790
```

*FIG. 7D*

950 in response to determining that a user equipment (UE) is to be deregistered at least from a network slice of the network, start a timer, and refrain from relinquishing a unit of network slice quota held by the UE while the timer is running    955 in response to receiving, from the UE, a request for registration with the network slice prior to expiration of the timer, stop the timer, and send to the UE a registration accept message that indicates the UE is allowed to use the network slice    960

*FIG. 9B*

1200 receive a first request for establishment of a protocol data unit (PDU) session on a network slice of the network, wherein the first request includes an identification of the PDU session, an identification of a user equipment that is requesting said establishment, and an identification of the network slice 1210

↓ in response to receiving said first request, search a list of records associated with the network slice, to determine whether the list contains a particular record that includes the UE identification and the PDU session identification of said first request 1215

↓ in response to determining that the list does not contain said particular record and that a maximum number of PDU sessions allowed to use the network slice has not been reached, add a new record to the list, wherein the new record includes the UE identification and the PDU session identification of the first request 1220

*FIG. 12*

ENHANCEMENTS FOR HANDLING NETWORK SLICE QUOTA

PRIORITY CLAIM INFORMATION

This application claims the benefit of priority to U.S. Provisional Application No. 63/028,409, filed May 21, 2020, titled "Enhancements for Handling Network Slice Quota", which is incorporated by reference in its entirety as though fully and completely set forth herein.

FIELD

The present application relates to wireless communication, and more particularly, to mechanism for implementing a quota on the number of user equipments allowed to use a network slice in a communication network.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), 3GPP LTE, LTE Advanced (LTE-A), 3GPP 5G, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

In order to perform cellular communication, a user equipment (UE) typically first selects and registers with a public land mobile network (PLMN), which will then provide cellular communication services to the UE. A PLMN is a land based network provided by a specific operator in a specific country. For example, a PLMN in a given country might support a combination of cellular technologies such as GSM/2G, UMTS/3G, and LTE/4G.

A PLMN may support multiple network slices, e.g., logical (or virtual) end-to-end networks. Each of the network slices may provide a different set of features and services. Different UEs may need or desire to access different network slices, or different sets of network slices. For example, a smart phone and a home utility meter may need to access different sets of network slices. Or a given UE may need to access different slices when reading email versus conducting a phone conversation. Each slice is uniquely identified by a corresponding S-NSSAI value. (S-NSSAI is an acronym for Single-Network Slice Selection Assistance Information.)

SUMMARY

Various embodiments described herein refer to a "network slice quota (NSQ) node". The NSQ node may be configured to manage quotas for respective network slices of a PLMN. (A quota for a network slice may be interpreted as a maximum number of user equipment devices that are allowed to access the network slice.) The NSQ node is said to implement a network slice quota function, or equivalently, a network slice access control function (NSACF). The NSQ node may also be referred to as an NSACF node.

In some embodiments, a method for operating a network node may be performed as follows. The network node may initiate a process of authenticating and/or authorizing a first user equipment (UE) to use a network slice of the network. In response to receiving an indication that the process has successfully authenticated and/or authorized the first UE to use the network slice, the network node may send a query message to a network slice quota node. The query message may represent an inquiry on whether there is available quota for an addition of the first UE to a number of user equipments using the network slice. In response to receiving a positive response to the query message, the network node may send a quota update message that requests the network slice quota node to update the available quota. In response to receiving a confirmation message that the available quota has been updated based on said quota update message, the network node may send a registration accept message to the first UE, indicating that the first UE is authorized to use the network slice.

In some embodiments, a method for operating a network node may be performed as follows. In response to receiving, from a user equipment (UE), a request for registration to use a network slice, the network node may send a query message to a network slice quota (NSQ) node, wherein the query message represents an inquiry on whether there is available quota for an addition of the UE to a number of user equipments using the network slice. Furthermore, in response to receiving, from the NSQ node, a positive response to the query message, the network node may preemptively claim a unit of network slice quota for the UE prior to initiation of a procedure to authenticate and/or authorize the UE to use the network slice, wherein said preemptively claiming includes sending to the NSQ node a request for the NSQ to update the available quota for the network slice.

In some embodiments, a method for operating a network node may be performed as follows. In response to determining that a user equipment (UE) is to be deregistered at least from a network slice of the network, the network node may start a timer, and refrain from relinquishing a unit of network slice quota held by the UE while the timer is running. In response to receiving, from the UE, a request for registration with the network slice prior to expiration of the timer, the network node may stop the timer, and send to the UE a registration accept message that indicates the UE is allowed to use the network slice.

In some embodiments, a method for operating a network node may be performed as follows. The network node may receive a first request for registration of a protocol data unit (PDU) session on a network slice of the network. The first request may include an identification of the PDU session, an identification of a user equipment that is requesting said registration, and an identification of the network slice. In response to receiving said first request, the network node may search a list of records associated with the network slice, to determine whether the list contains a particular record that includes the UE identification and the PDU session identification of said first request, wherein each record of the list includes a distinct combination of UE identification and PDU session identification. In response to determining that the list does not contain said particular record and that a maximum number of PDU sessions allowed to use the network slice has not been reached, the network node may add a new record to the list, wherein the new record includes the UE identification and the PDU session identification of the first request, and increment a count of PDU sessions using the network slice.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document.

Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 7B illustrates a method for operating a network node (such as an Access & Mobility Management Function node) in the context of network slice authorization and/or authentication, according to some embodiments.

FIG. 7D illustrates a method for preemptive acquisition of network slice quota prior to initiation of an authorization and/or authentication procedure for a UE, according to some embodiments.

FIG. 9B illustrates a timer-based mechanism to maintain network slice quota held by a UE through events that cause temporary deregistration of the UE from the network, according to some embodiments.

FIG. 12 illustrates a method for PDU session establishment that is informed by the provision of UE identification information, according to some embodiments.

Figure 1:
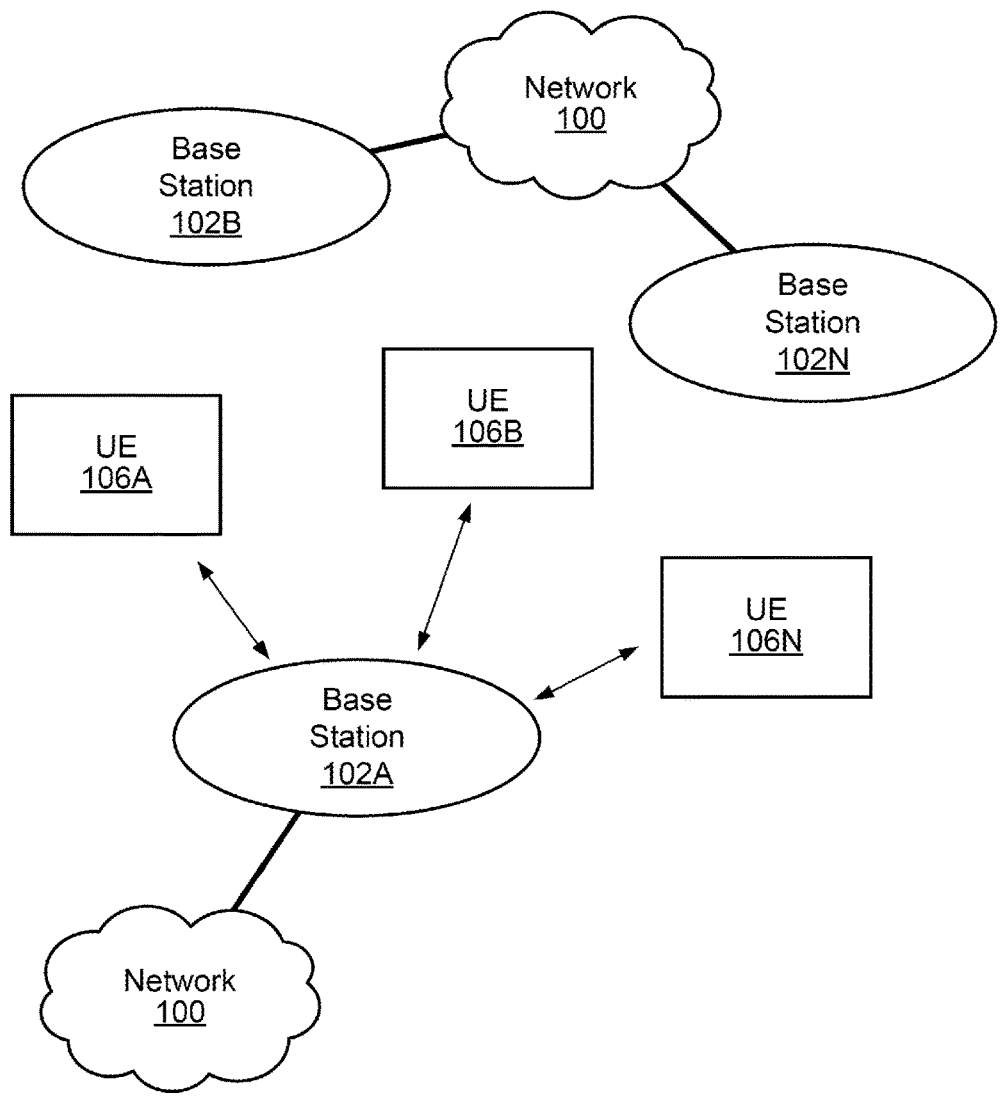
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
4G: $4^{th}$ Generation
5G: $5^{th}$ Generation
5G NR: 5G New Radio
5GS: 5G System
AMF: Access and Mobility Management Function
EAP: Extensible Authentication Protocol
LTE: Long Term Evolution
NR: New Radio
PDCCH: Physical Downlink Control Channel
PDU: Protocol Data Unit
PLMN: Public Land Mobile Network
NRF: Network Repository Function
NSAAA: Network Slice Authentication, Authorization and Accounting
NSACF: Network Slice Access Control Function
NSQ: Network Slice Quota
NSSAI: Network Slice Selection Assistance Information
NSSF: Network Slice Selection
RAN: Radio Access Network
RAT: Radio Access Technology
S-NSSAI: Single Network Slice Selection Assistance Information
SMF: Session Management Function
UDM: Unified Data Management
UDR: Unified Data Repository
UMTS: Universal Mobile Telecommunication System Terms The following is a glossary of terms used in this disclosure Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, unmanned aerial vehicles (UAVs), unmanned aerial controllers (UACs) and vehicles, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
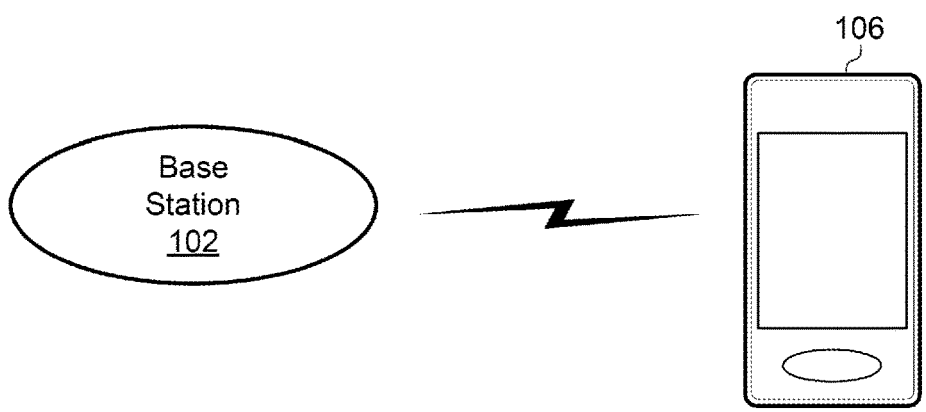
FIG. 2 illustrates a base station (BS) in communication with a user equipment (UE) device according to some embodiments.

FIGS. 1 and 2—Communication System

FIG. 1 illustrates a simplified example wireless communication system, according to one embodiment. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

A communication area (or coverage area) provided by the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G NR, HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB'. If the base station 102A is implemented in the context of 5G NR, it may alternately be referred to as a 'gNodeB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus provide a network of cells, which may provide spatially continuous or nearly spatially continuous service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, a base station may provide a plurality of cells, e.g., cells which operate a different frequencies (or uplink-downlink frequencies pairs in the case of FDD.) Thus, different sets of UEs may be simultaneously connected to different cells of the same base station. Furthermore, a given UE may simultaneously connect to more than one cell of a base station.

Note that a UE 106 may be capable of communicating using multiple wireless communication standards. For example, the UE 106 may be configured to communicate using a wireless networking (e.g., Wi-Fi) and/or peer-to-peer wireless communication standard (e.g., Bluetooth, Wi-Fi peer-to-peer, etc.) in addition to at least one cellular communication standard. Cellular communication standards include standards such as GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc. The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication standard, if desired. Other combinations of wireless communication standards (including, e.g., more than two wireless communication standards) are also possible.

FIG. 2 illustrates user equipment 106 (e.g., one of the devices 106A through 106N) in communication with a base station 102, according to one embodiment. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or NR (or LTE or 1×RTT, or LTE or GSM), and separate radios for communicating using each of Wi-Fi and Bluetooth. Other configurations are also possible.

Figure 3:
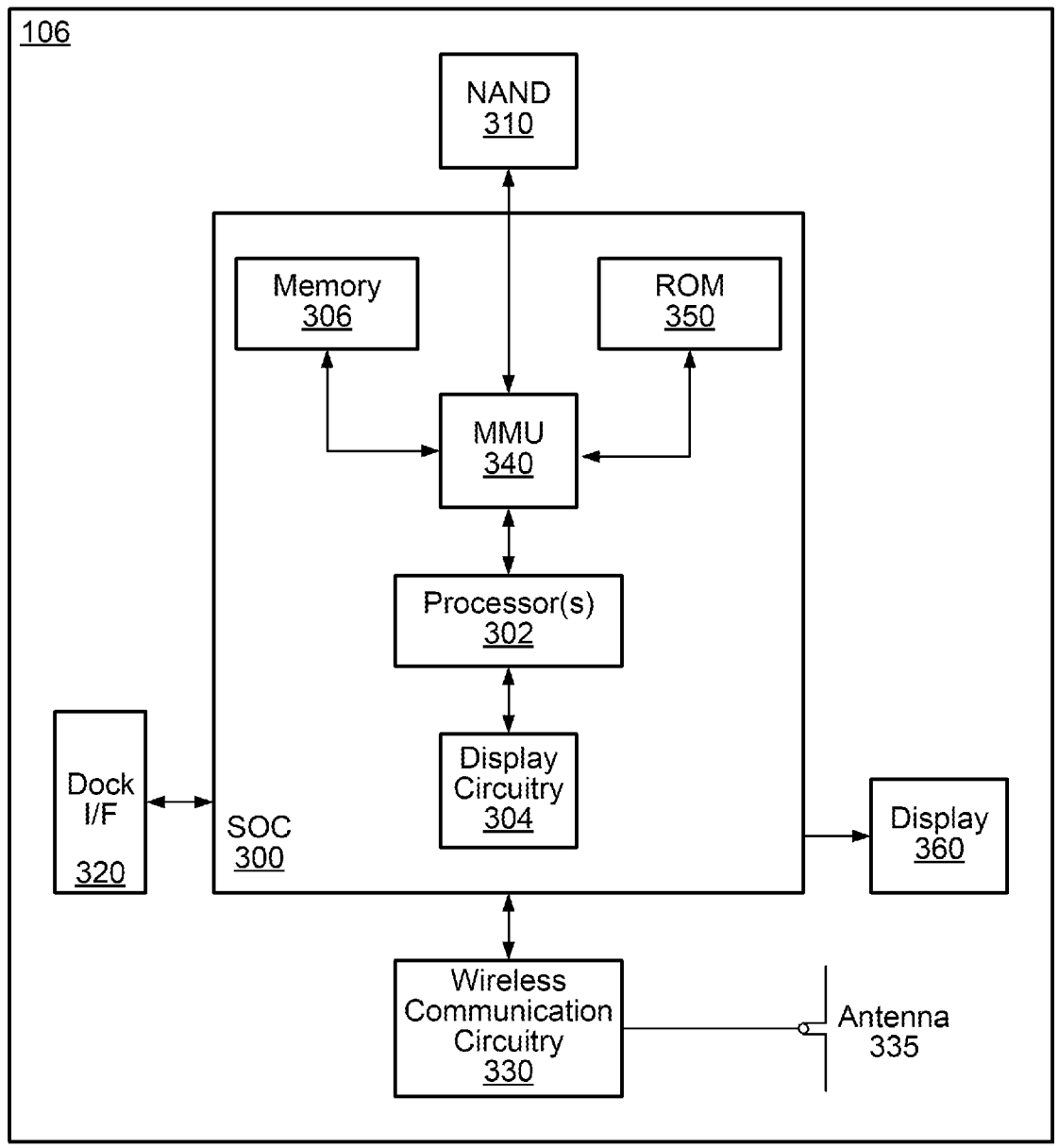
FIG. 3 illustrates an example block diagram of a user equipment (UE) according to some embodiments.

FIG. 3—Block Diagram of a UE

FIG. 3 illustrates an example block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash memory 310), a connector interface 320 (e.g., for coupling to a computer system, dock, charging station, etc.), the display 360, and wireless communication circuitry 330

(e.g., for LTE, LTE-A, NR, CDMA2000, Bluetooth, Wi-Fi, GPS, etc.). The UE may also include at least one SIM device, and may include two SIM devices, each providing a respective international mobile subscriber identity (IMSI) and associated functionality.

As shown, the UE device 106 may include at least one antenna (and possibly multiple antennas, e.g., for MIMO and/or for implementing different wireless communication technologies, among various possibilities) for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as a display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 106 may include hardware and software components for implementing features for performing more efficient cellular base station scanning, such as those described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
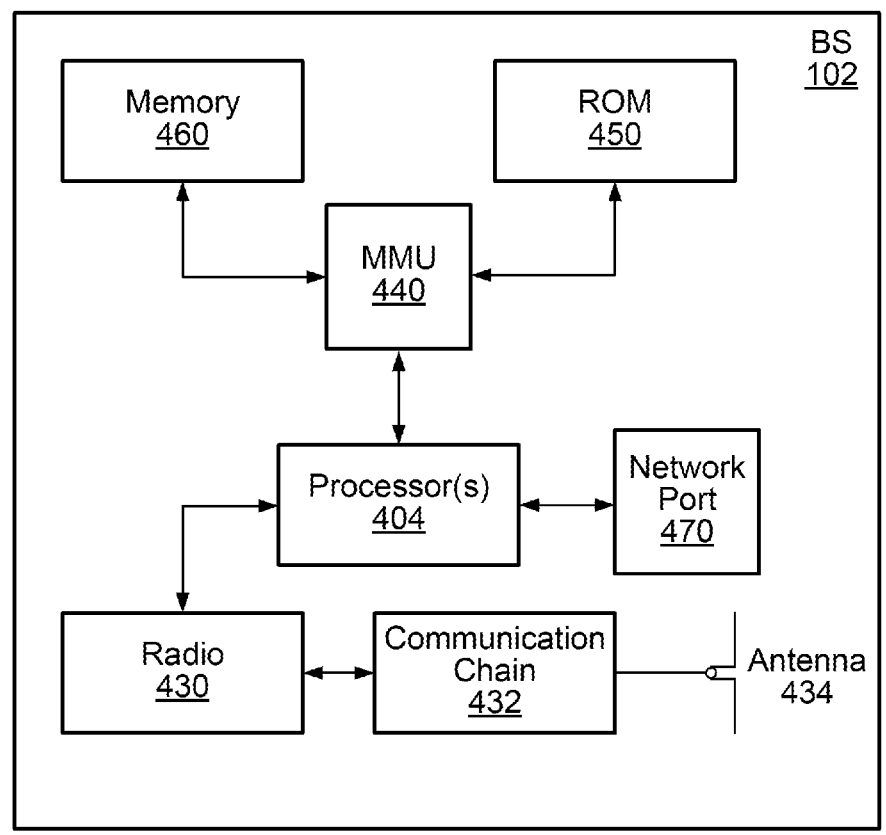
FIG. 4 illustrates an example block diagram of a BS according to some embodiments.

FIG. 4—Block Diagram of a Base Station

FIG. 4 illustrates an example block diagram of a base station 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, 5G NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Enhancements to the Handling of Network Slice Quota (NSQ)

A fundamental issue for a network (e.g., Public Land Mobile Network) that supports network slicing is how to support a quota on the maximum number of UEs per slice. (Such a quota may be necessary to avoid compromises to service quality for UEs.) Basic questions include: how does the network (e.g., a 5G System) know about the current number of UEs accessing a network slice; which network function(s) need to know this information; whether and how the network enforces such a quota when a UE requests registration on a network slice and that registration would cause the quota to be exceeded. In some embodiments, the network may include a Network Slice Quota (NSQ) function that manages the quota.

Figure 5:
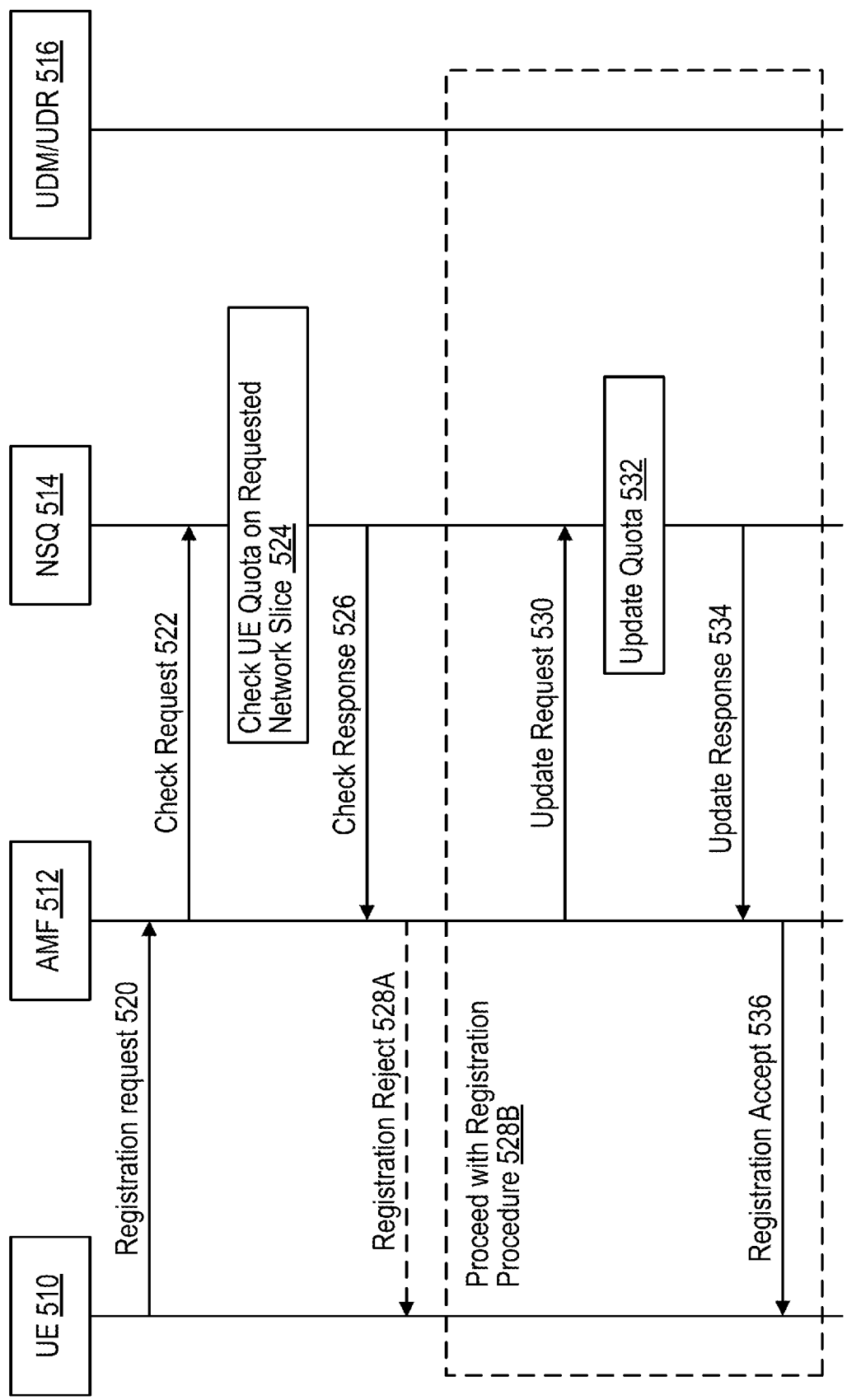
FIG. 5 illustrates a method for managing network slice quota, according to some embodiments.

FIG. 5 illustrates a method for managing network slice quota, according to some embodiments. The method may involve a UE 510, an Access & Mobility Management Function (AMF) 512, a Network Slice Quota (NSQ) Function 514, and a UDM/UDR Function 516. UDM stands for Unified Data Management. UDR stands for Unified Data Repository.

The UE may send a registration request 520 to the AMF. The registration request indicates that the UE is requesting registration to one or more network slice(s) of the network.

The registration request may include an identification of the UE and an identification of each requested network slice. The identification for a network slice may be an S-NSSAI value. (S-NSSAI is an acronym for Single—Network Slice Selection Assistance Information.)

In response to receiving the registration request, the AMF may send a check request 522 to the NSQ. The check request indicates that the AMF is inquiring whether there is available quota for the UE to register on the network slice(s). The check request may include the UE identification, the S-NSSAI value(s), and a control mode value set equal to "UE numbers per network slice".

In response to receiving the check request, the NSQ may check UE quota on the requested network slice(s), as shown at 524, and send a check response 526 to the AMF. The check response may indicate, for each requested network slice, whether quota is available for the registration of the UE on the network slice. The check response may include the S-NSSAI value(s) of the network slice(s), and an indication (indications) of whether or not quota is available. (In some embodiments, the check response may also include the UE identification.)

If quota is not available for all of the slices requested by the UE, the AMF may send a registration reject message 528A to the UE. The registration reject message indicates that the UE is not allowed to use the requested network slice(s). The registration reject message may include the S-NSSAI value(s) of the network slice(s), an indication of the cause of rejection (e.g., reject_cause="max number of UEs on network slice reached"), and a back-off timer value. The back-off timer value may indicate a minimum amount of time the UE should wait (e.g., after receipt of the registration reject message) before attempting another registration request.

Alternatively, if the quota is available on one or more of the requested network slices, the AMF may proceed with the registration of the UE, as shown at 528B. Thus, the AMF may send an update request 530 to the NSQ for the one or more network slices. The update request represents a request that the NSQ update the quota for each of the one or more network slices in view of the UE's present registration. The update request may include the UE identification, the S-NSSAI value of each of the one or more network slice(s), and a flag indicating that the available quota for the one or more network slices should be decremented. (Available quota and Used Quota for a given network slice are complementary in the sense that their sum is equal to the maximum number of UEs allowed on the given network slice.)

In response to receiving the update request, the NSQ updates, for each of the one or more network slices, the available quota for the network slice, e.g., the number of UEs allowed to use the network slice, as shown at 532, and sends an update response 534 to the AMF. The update response indicates that the NSQ has updated the quota(s). The update response may include the S-NSSAI value of each of the one or more the network slices that has been successfully updated. The update response may also include the UE identification.

In response to receiving the update response, the AMF may send a registration accept message 536 to the UE. The registration accept message indicates that the UE's registration request has been accepted (allowed). The registration accept message may include the S-NSSAI value of each requested network slice that has been successfully updated by the NSQ, and thus, successfully registered with the network.

In response to receiving the registration accept message, the UE may start using the registered network slice(s), i.e., using the communication services provided by the registered network slice(s).

Figure 6:
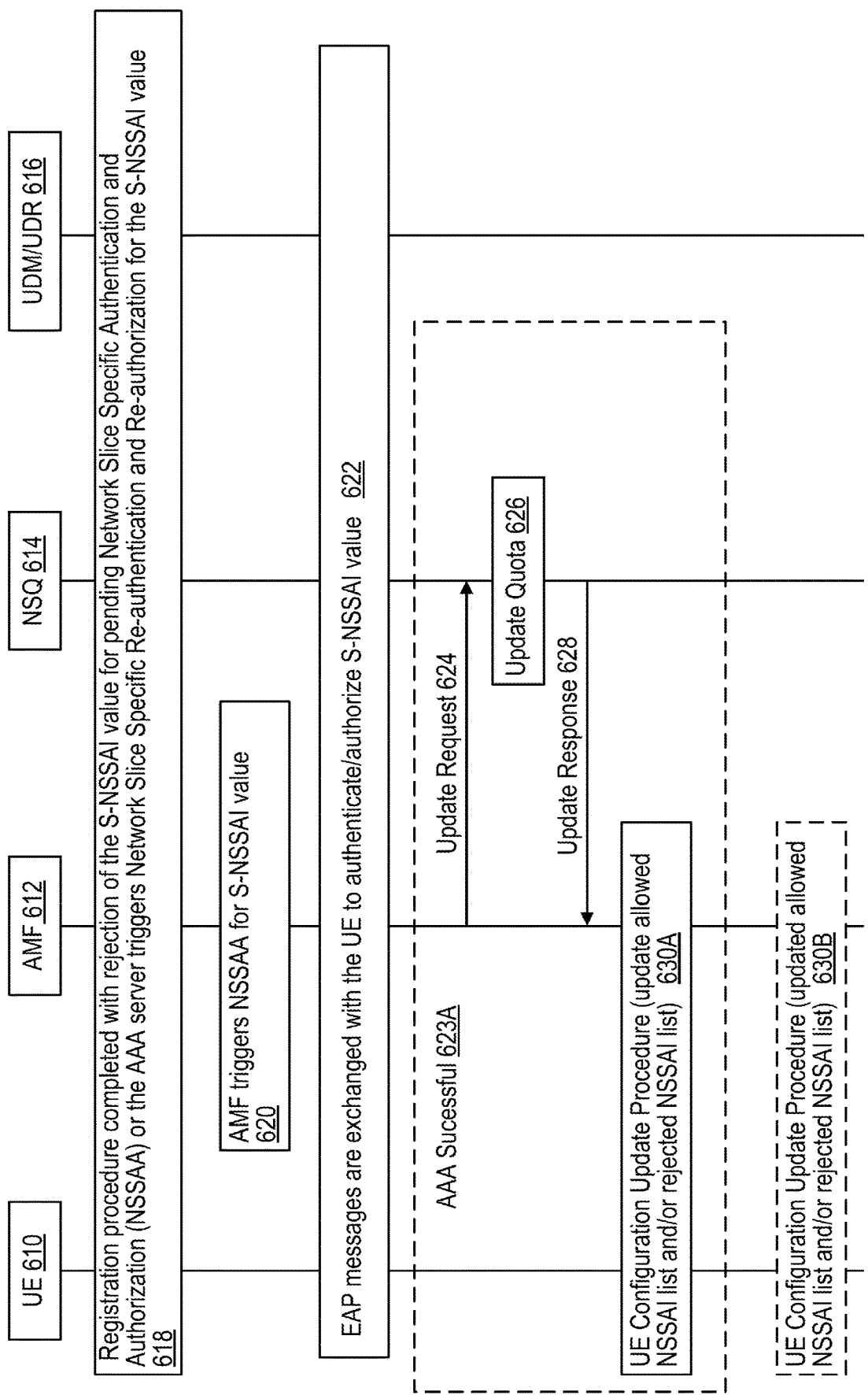
FIG. 6 illustrates a method for managing network slice quota in conjunction with the authorization and/or authentication (AAA) of the UE, according to some embodiments.

FIG. 6 illustrates a method for managing network slice quota in conjunction with the authorization and authentication (AAA) of the UE, according to some embodiments. The method may involve a UE 610, an Access & Mobility Management Function (AMF) 612, a Network Slice Quota (NSQ) Function 614, and a UDM/UDR Function 616. (UDM stands for Unified Data Management. UDR stands for Unified Data Repository.)

At 618, one may assume that the registration procedure (for the UE) completed with temporary rejection of the requested S-NSSAI value for pending Network Slice Specific Authentication and Authorization (NSSAA) or the AAA server triggers Network Slice Specific Re-authentication and Re-authorization for the S-NSSAI value.

At 620, the AMF may trigger NSSAA for the UE's requested network slice, i.e., for the requested S-NSSAI value. For example, the AMF may send an AAA request to an AAA server. (The AAA server may reside outside the PLMN, in an external network.)

At 622, the AAA server may exchange messages, e.g., Extensible Authentication Protocol (EAP) messages, with the UE to authorize and authenticate the UE to use the network slice corresponding to the S-NSSAI value.

If the AAA procedure completes successfully, the operations in the dotted box 623A may be performed. The AMF may send an update request 624 to the NSQ. (The AAA server may send a message to AMF indicating whether the authorization and authentication of the UE relative to the network slice was successful.) The update request represents a request for the NSQ to update the quota for the network slice. The update request may include an identification of the UE (the UE ID), the S-NSSAI value of the requested network slice, and a quota update flag.

In response to receiving the update request, the NSQ may update the quota for the network slice (as shown at 626), and send an update response 628 to the AMF. The update response indicates that the requested update has been performed. The update response may include the S-NSSAI value of the network slice.

In response to receiving the update request, the AMF may perform a configuration update procedure 630A, to inform the UE that it is allowed to use the requested network slice. The configuration update procedure may include sending to the UE an allowed NSSAI list including the S-NSSAI value, and/or, a rejected NSSAI list excluding the S-NSSAI value.

Alternatively, if the AAA procedure is unsuccessful, the AMF may perform a configuration update procedure 630B, to inform the UE that it is not allowed to use the requested network slice. The configuration update procedure 630B may include sending to the UE an allowed NSSAI list excluding the S-NSSAI value, and/or, a rejected NSSAI list including the S-NSSAI value.

In some embodiments, for the S-NSSAIs which are subject to NSAAA, the AMF may not check with the NSQ (for available quota) prior to initiating the NSAAA since these S-NSSAIs will not be allowed until the end of NSAAA procedure, which may take 10-15 seconds, for example, depending on home/roaming scenarios, and response time of AAA Server. (None of the embodiments disclosed herein depend on a specific range of values for the NSAAA procedure duration, unless otherwise stated.) With such a large amount of elapsed time, the quota has a significant probability of changing. Thus, any indication of available quota received prior to NSAAA initiation may not be valid after the NSAAA has completed.

In some embodiments, the AMF may check with the NSQ prior to initiating the NSAAA, and receive an indication of available quota. After the NSAAA is complete, the AMF may assume that the quota is still available, and request the NSQ to decrement the available quota for the network slice if the NSAAA for the network slice was successful. (If the NSAAA was not successful, the quota does not need to be changed.)

Figure 7A:
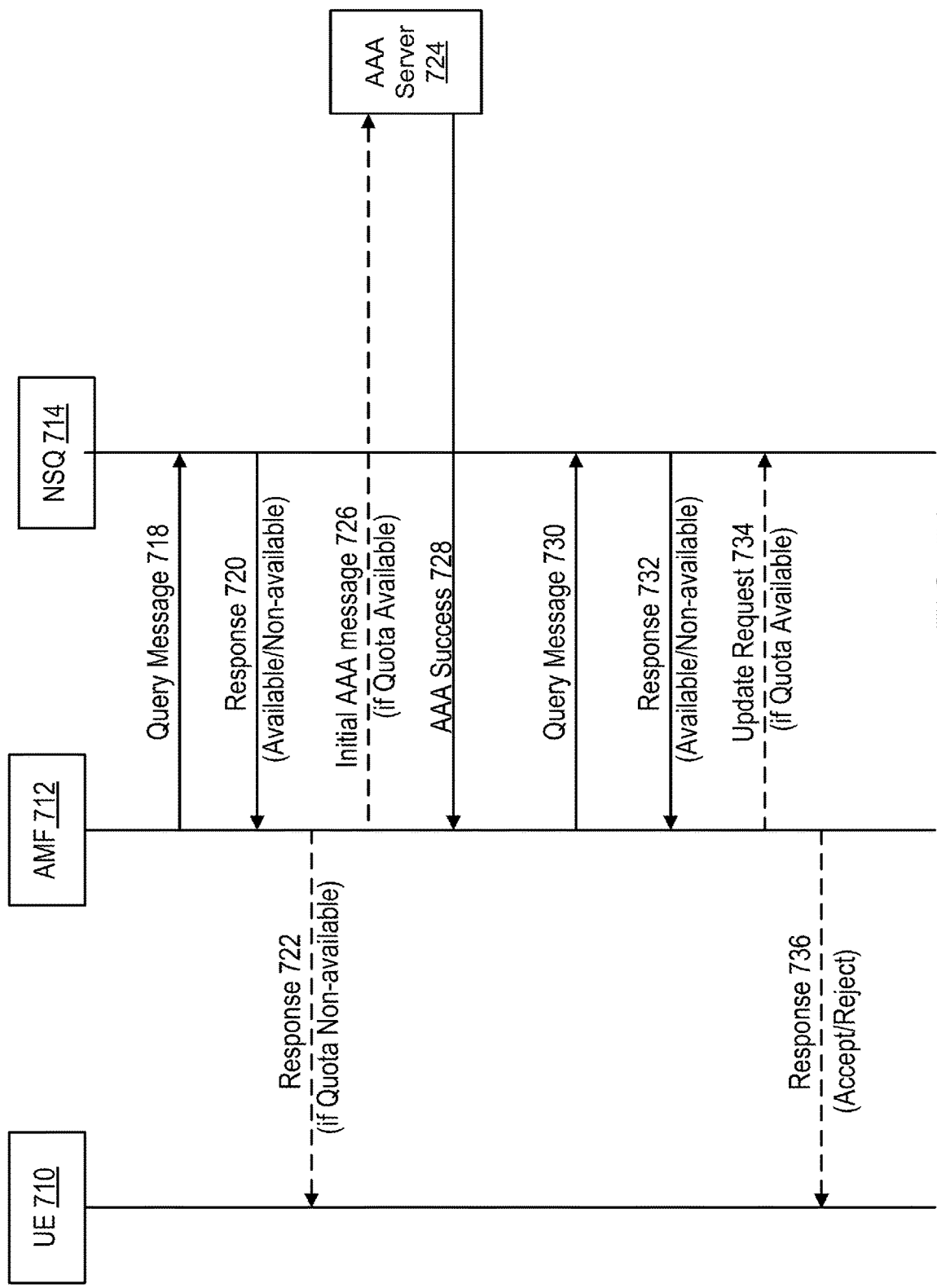
FIG. 7A illustrates a method for handling a UE registration request in the context of network slice authorization and/or authentication, according to some embodiments.

In some embodiments, a method for handling a UE registration request in the context of network slice authorization and authentication (NSAAA) may be performed as shown in FIG. 7A. The method may involve a user equipment (710), an Access & Mobility Management Function (AMF) 712, and a Network Slice Quota (NSQ) Function 714.

Before initiation of NSAAA, the AMF may send a query message 718 to the NSQ, to check whether quota is available for the UE to use the UE-requested network slice. (The network slice is identified by an S-NSSAI value.) The NSQ sends a response 720 indicating whether quota is available or non-available on the network slice.

If quota is not available, the AMF may not attempt to proceed with NSAAA for this network slice, and send a response message 722 to the UE, indicating that the requested network slice (S-NSSAI value) is rejected. The response message may include a cause code that is set to a value indicating "quota not available" as the cause of rejection. Thus, the UE is not allowed to use the requested network slice. (The response message 722 may be responsive to a registration request sent by the UE, e.g., as variously described above.)

If quota is available, the AMF may initiate the NSAAA procedure (e.g., an EAP-based procedure) by sending an initial AAA message 726 to an AAA server 724. The NSAAA procedure may typically take 10-15 seconds based on home/roaming scenarios, and the response time of the AAA server. (However, it should be understood that the inventive principles disclosed herein do not relay on any particular range of values for the duration of the NSAAA procedure.)

Assuming the AAA server responds with an AAA success message 728 (indicating successful completion of the authorization and authentication of the UE to use the network slice), the AMF may send a query message 730 to the NSQ, to check whether quota is still available on the requested network slice. The NSQ may send a response message 732 indicating whether quota is available.

If response message 732 indicates that quota is available, the AMF may send an update request 734 to the NSQ, and send a response message 736 to the UE, indicating registration acceptance (i.e., allowance of the requested network slice). The update request 734 represents a request that the NSQ update its quota to reflect the addition of the UE to the network slice. The NSQ may implement the quota update by decrementing an allowed quota and/or incrementing a used quota.

Alternatively, if the response message 732 indicates that quota is not available, the AMF may send response 736 to the UE, indicating registration rejection, i.e., indicating that the UE is not allowed to use the requested network slice. The response 736 may include a cause code that is set to a value indicating "quota not available" as the cause of rejection.

It was assumed above that the NSAAA procedure completed with success. Alternatively, if the NSAAA procedure fails, the AMF may not contact the NSQ, and may send the UE a reject message, indicating rejection of the requested network slice (S-NSSAI value).

In some embodiments, a method 750 for operating a network node (such as an Access & Mobility Management Function node) may include the operations shown in FIG. 7B. (The method 750 may also include any subset of the elements, embodiments and features described above in connection with FIGS. 1-7A.) The network node may include a processing element configured to perform the method 750. For example, the processing element may perform the method 750 by executing program instructions stored in a memory of the network node. The network node may reside in a core network of a Public Land Mobile Network (PLMN), e.g., a 5G network.

At 755, the processing element may initiate a process of authenticating and/or authorizing a first user equipment (UE) to use a network slice of the network. The processing element may have already identified the network slice (or, the S-NSSAI value of the network slice) as being subject to authentication and/or authorization. (Not all slices of the network need to be subject to authentication and/or authorization. For example, some network slice may have a more open policy of access to UEs.)

At 760, in response to receiving an indication that the process has successfully authenticated and/or authorized the first UE to use the network slice, the processing element may send a query message to a network slice quota node. The query message represents an inquiry on whether there is available quota for an addition of the first UE to a number of user equipments using the network slice.

At 765, in response to receiving a positive response to the query message, the processing element may send a quota update message that requests the network slice quota node to update the available quota.

At 770, in response to receiving a confirmation message that the available quota has been updated based on said quota update message, the processing element may send a registration accept message to the first UE, indicating that the first UE is authorized to use the network slice.

In some embodiments, the processing element is configured to perform said initiating in response to: receiving, from the first UE, a request for access to the network slice; determining that the network slice is subject to authentication and/or authorization; based on the request for access, sending a preliminary query, to the network slice quota node, representing an inquiry on whether there is available quota for an addition of the first UE to a number of user equipments using the network slice; and receiving a positive response to the preliminary query.

In some embodiments, the processing element may be configured to initiate the process by sending an initiation message to an authentication and authorization (AAA) server in the network or external to the network. (The AAA server may be owned or operated by an entity different than an owner or operator of the network.)

In some embodiments, the network is a 3GPP 5G core network; and the network node implements an Access and Mobility Management Function.

In some embodiments, the processing element may be configured to send the registration accept message to the UE via a wireless base station (e.g., a gNB of 5G NR) of the network.

In some embodiments, the network node may also include a network interface configured to interface with the network.

Figure 7C:
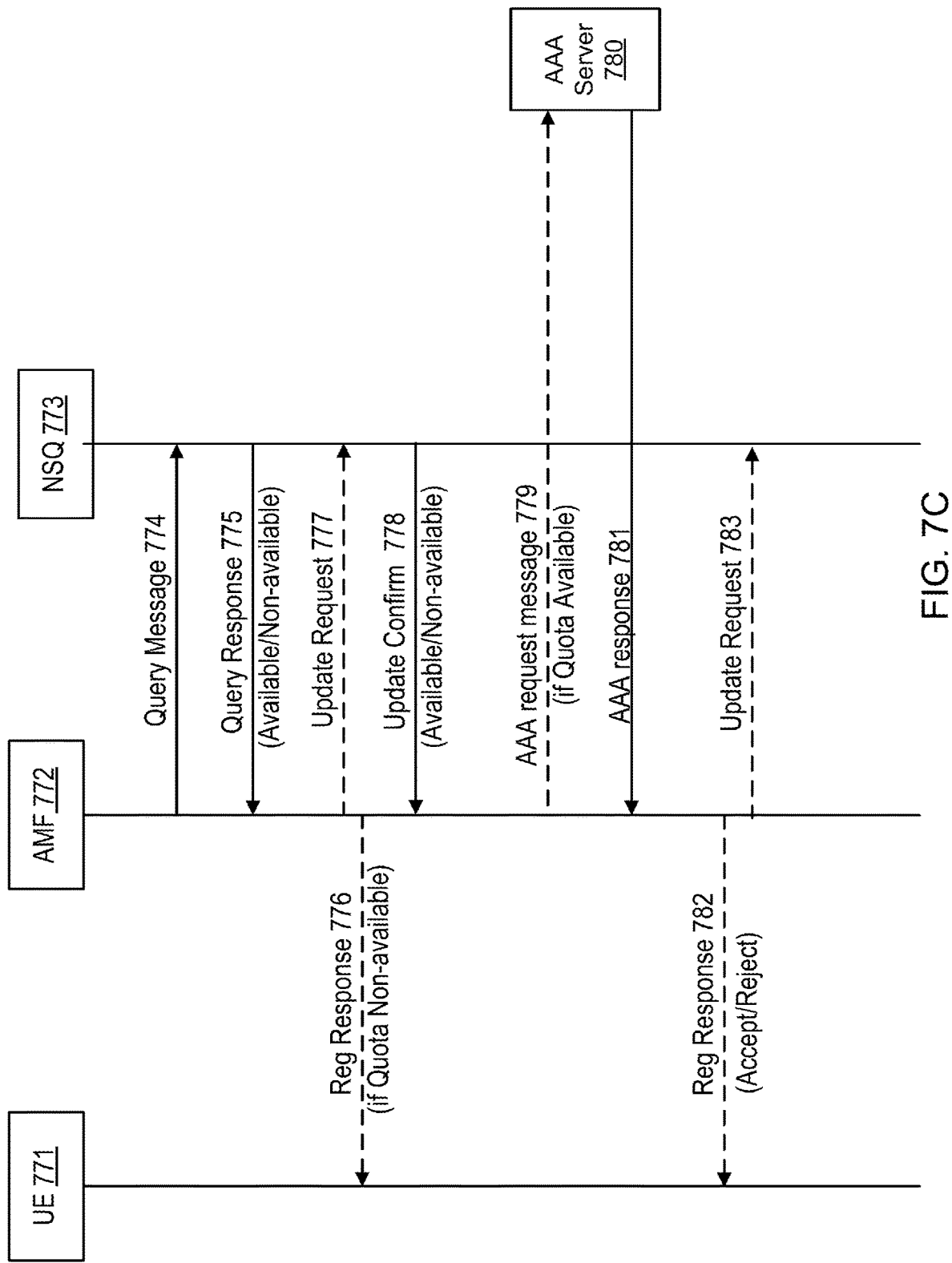
FIG. 7C illustrates a method for handling a UE registration request in the context of network slice authorization and/or authentication, according to some embodiments.

In some embodiments, a method for handling a UE registration request in the context of network slice authorization and authentication (NSAAA) may be performed as shown in FIG. 7C. The method may involve a user equipment (771), an Access & Mobility Management Function (AMF) 772, and a Network Slice Quota (NSQ) Function 773.

Before initiation of NSAAA, the AMF may send a query message 774 to the NSQ, to check whether quota is available for the UE to use the UE-requested network slice. (The network slice is identified by an S-NSSAI value.) The NSQ sends a query response 775 indicating whether quota is available or non-available on the requested network slice.

If quota is not available, the AMF does not attempt to proceed with NSAAA for this network slice, and sends a response message 776 to the UE, indicating that the requested network slice (S-NSSAI value) is rejected. Thus, the UE is not allowed to use the requested network slice. The response message may include a cause field that is set to a value indicating "quota not available" as the cause of rejection. (The response message 776 may be responsive to a registration request sent by the UE, e.g., as variously described above.)

If quota is available, the AMF may send an update request 777 to the NSQ, requesting that the NSQ decrement the available quota for the requested network slice. Thus, the AMF proactively (and preemptively) claims a unit of quota for the UE before initiation of the NSAAA procedure.

If the NSQ responds with an update confirmation 778 (indicating that the requested update has been performed successfully), the AMF may then initiate the NSAAA procedure (e.g., an EAP-based procedure) by sending an AAA request message 779 to an AAA server 780. The NSAAA procedure may typically take around 10-15 seconds, based on home/roaming scenarios, and response time of the AAA server. (However, it should be understood that the inventive principles described herein do not rely on any range of values for the duration of the NSAAA procedure.) The AAA server may respond with an AAA response message 781, indicating whether the authorization and authentication of the UE (to use the network slice) was successful.

In response to receiving the AAA response message 781, the AMF may send a registration response message 782 to the UE, indicating whether the UE's request for registration to the network slice is accepted or rejected. (In contrast with FIG. 7A, the AMF of FIG. 7C doesn't check for quota availability after completion of the NSAAA procedure because it has already claimed a unit of quota for the UE prior to initiation of the NSAAA procedure.) If the AAA response indicates successful authorization and authentication, the registration response indicates acceptance to use the requested network slice. If the AAA response indicates failure of the authorization and authentication, the registration response indicates rejection of the request to use the requested network slice.

Furthermore, if the AAA response 781 indicates failure of the NSAAA procedure, the AMF may send an update request 783 to the NSQ, requesting the NSQ to increment the available quota for the UE-requested network slice, thus liberating the unit of quota held on behalf of the UE.

In some embodiments, a method 785 for operating a network node (such as an Access & Mobility Management Function node) may include the operations shown in FIG. 7D. (The method 785 may also include any subset of the elements, embodiments and features described above in connection with FIGS. 1-7A and FIG. 7C.) The network node may include a processing element configured to perform the method 785. For example, the processing element may perform the method 785 by executing program instructions stored in a memory of the network node. The network node may reside in a core network of a Public Land Mobile Network (PLMN), e.g., a 5G network.

At 789, in response to receiving, from a user equipment (UE), a request for registration to use a network slice, the processing element may send a query message to a network slice quota (NSQ) node, wherein the query message represents an inquiry on whether there is available quota for an addition of the UE to a number of user equipments using the network slice.

At 790, in response to receiving, from the NSQ node, a positive response to the query message, the processing element may preemptively claim a unit of network slice quota for the UE prior to initiation of a procedure to authenticate and/or authorize the UE to use the network slice, wherein said preemptively claiming includes sending to the NSQ node a request for the NSQ to update the available quota for the network slice.

In some embodiments, in response to receiving from the NSQ node a confirmation that the available quota for the network slice has been updated, the processing element may initiate said procedure to authenticate and/or authorize the UE to use the network slice.

In some embodiments, in response to receiving an indication that the procedure has successfully authenticated and/or authorized the UE to use the network slice, the processing element may send a registration accept message to the UE, indicating that the UE is allowed to use the network slice.

In some embodiments, in response to receiving from the NSQ node a confirmation that the available quota has been updated, the processing element may initiate said procedure to authenticate and/or authorize the UE to use the network slice.

In some embodiments, in response to receiving an indication that the procedure has failed to authenticate and/or authorize the UE to use the network slice, the processing element may send a registration reject message to the UE, indicating that the UE is not allowed to use the network slice.

In some embodiments, in response to receiving, from the NSQ node, a negative response to the query message, the processing element may send, to the UE, a registration reject message, indicating that the UE is not allowed to use the network slice.

In some embodiments, the network node is an Access & Mobility Management Function (AMF) node of a 3GPP 5G core network.

Figure 8:
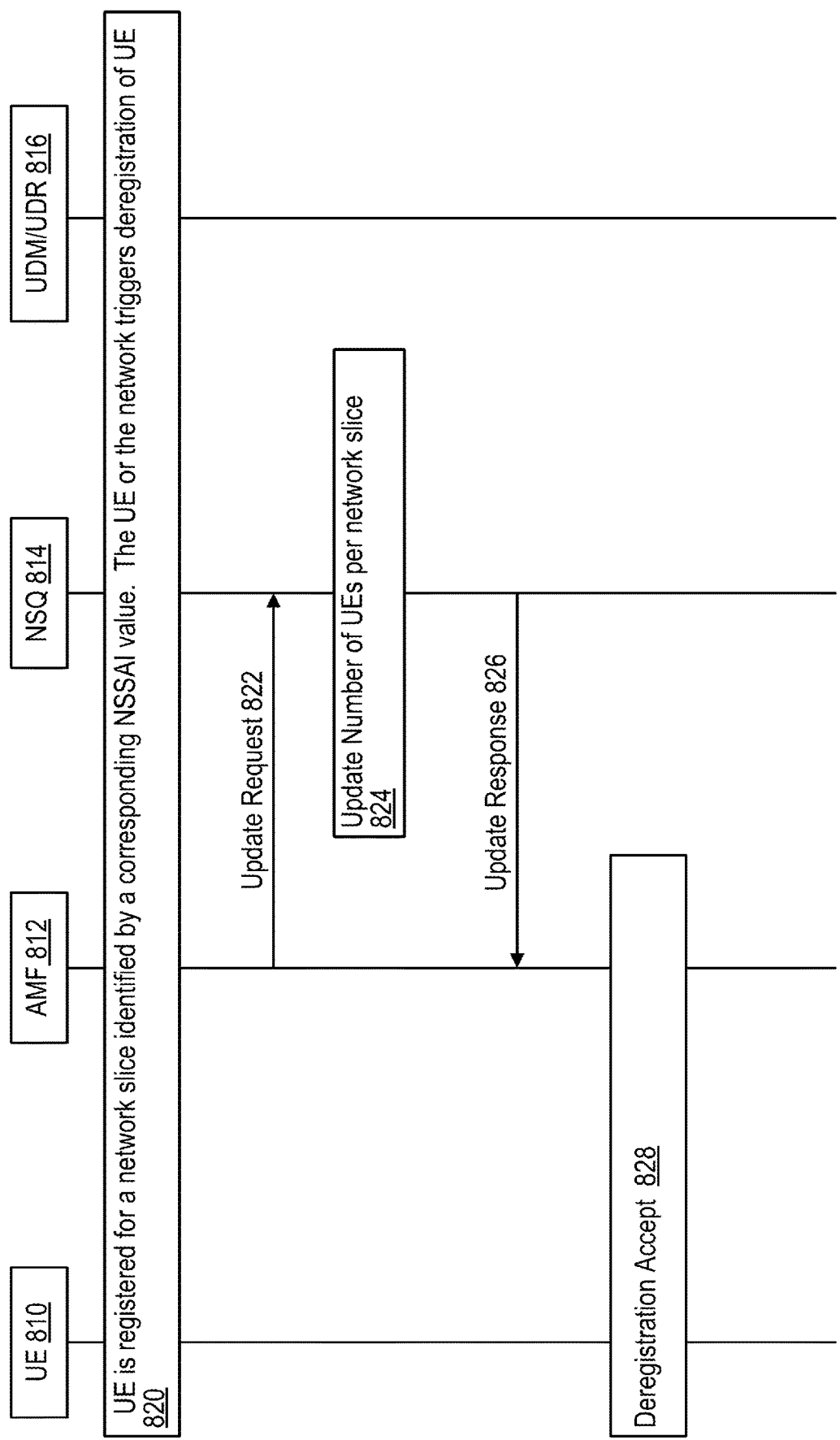
FIG. 8 illustrates a method for managing UE quota for a network slice during UE deregistration, according to some embodiments.

In some embodiments, a method for managing UE quota for a network slice during UE deregistration may be performed as shown in FIG. 8. The method may involve a user equipment (810), an Access & Mobility Management Function (AMF) 812, a Network Slice Quota (NSQ) Function 814, and a UDM/UDR node. UDM stands for Unified Data Management. UDR stands for Unified Data Repository.

At 820, the UE is assumed to be registered for a network slice (corresponding to NSSAI value). The UE or the network (e.g., the AMF) may trigger deregistration of UE from the network slice (or the network).

In response to the deregistration being triggered, the AMF may send an update request 822 to the NSQ, requesting that the available quota for the network slice be incremented. The update request may include an identification of the UE (the UE ID), an identification of the network slice (an S-NSSAI value), and a quota update flag indicating that the available quota should be incremented.

In response to receiving the update request, the NSQ may update the quota (as indicated at 824), and send an update response 826 indicating that the requested update has been performed successfully. The update response may include the S-NSSAI value. The update response may also include the UD IE.

In response to receiving the update response, the AMF may send a deregistration accept message 828, indicating that the UE has been deregistered from the network slice (or the network).

As shown in FIG. 8, the AMF may send an update request 822 to the NSQ, requesting for the NSQ to increment the available quota for the network slice. However, if the deregistration was due to an anomaly (e.g., a crash of the UE's baseband processing, a hard reset of the UE, panic in the UE's operating system, etc.) or due to user action such as toggling airplane mode UI switch, the UE is likely to request registration again to the same network slice within a short time, e.g., within 10 second, or within 20 seconds, or within 60 seconds, or within 120 seconds, etc. (The term "short time" may be interpreted differently in different embodiments, or application scenarios. UI is an acronym for User Interface.) Thus, there is a risk that the UE's registration count could be provided to another UE, and the returning UE would encounter a registration rejection. If the quota of the network slice becomes saturated (i.e., maximum number of UEs is attainted) in the intervening time, the UE may have to wait for an indefinite amount of time before quota becomes available.

Figure 9A:
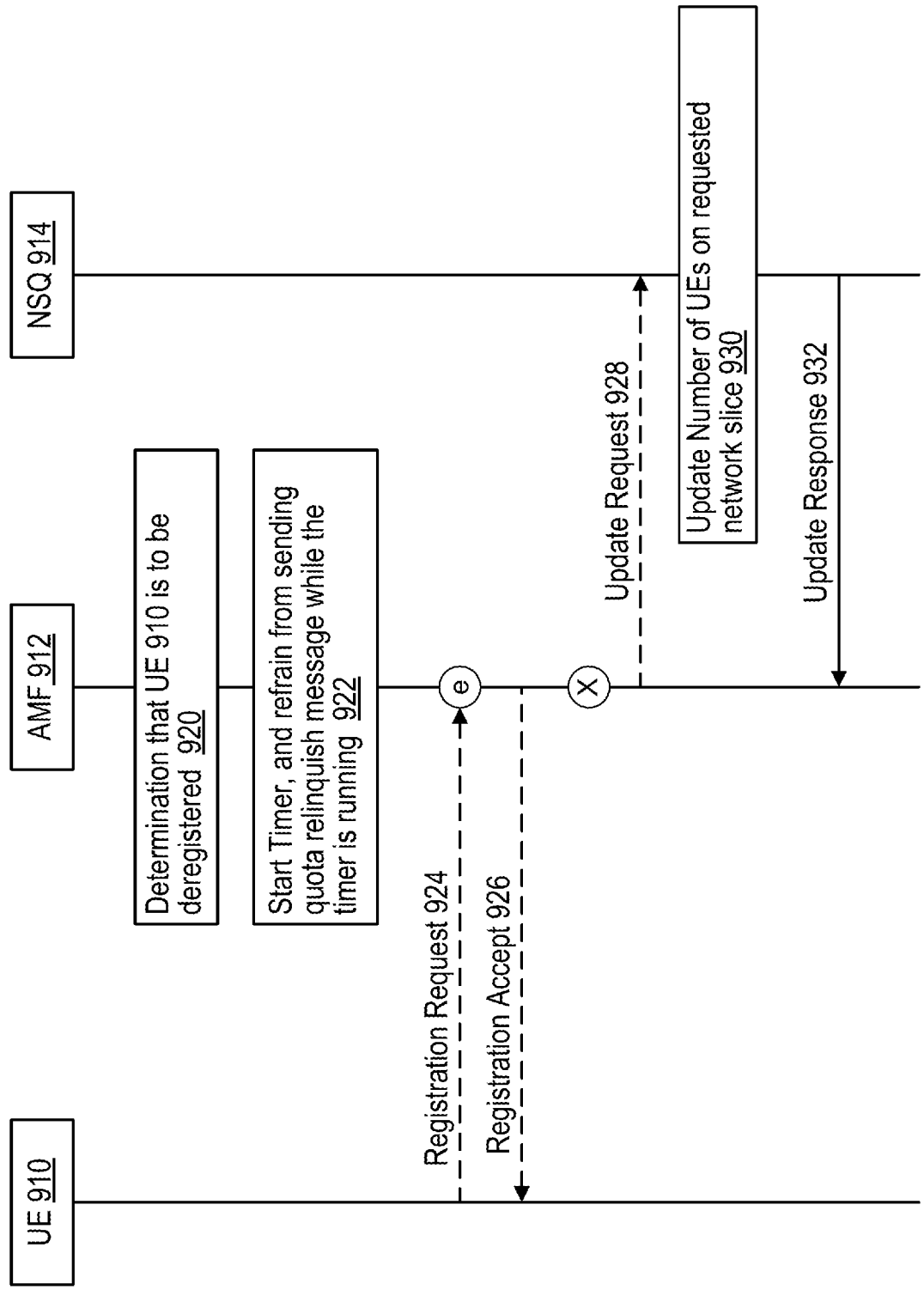
FIG. 9A illustrates a method for avoiding loss of right of access to a network slice when a UE encounters an anomalous event of brief duration, according to some embodiments.

FIG. 9A illustrates a method for avoiding loss of right of access to a network slice when a UE encounters an anomalous event of brief duration, according to some embodiments. The method may involve a user equipment (910), an Access & Mobility Management Function (AMF) 912, and a Network Slice Quota (NSQ) Function 914.

At 920, the AMF may determine that the UE is to be (or is being, or has been) deregistered from the network. For example, the AMF may receive a message (from the UE or from network node) indicating that the UE is to be deregistered. Alternatively, the AMF may itself determine that the UE is to be deregistered from the network, e.g., by a lack of response from the UE, or a lack of messages expected to be transmitted by the UE.

In response to determining that the UE is to be deregistered, the AMF may start a timer, and refrain from sending a quota relinquish message while the timer is running, as indicated at 922.

If the same UE attempts to register with the network—e.g., by sending a registration request 924 to the AMF—while the timer is running, the AMF may send a registration accept message 926 to the UE. (The registration request may include the S-NSSAI value of the requested network slice. The "e" symbol denotes early termination of the timer, due to receipt of the registration request.) The registration accept message may include the S-NSSAI value of the requested network slice. For example, the S-NSSAI value may be included in an Allowed S-NSSAI list of the registration accept message.

Alternatively, if the timer expires without having received a registration request from the UE, the AMF may send a quota update request 928 to the NSQ, requesting the NSQ to update (e.g., increment) its available quota for the network slice. In response to receiving the update request, the NSQ may update the quota (as indicated at 930), and send an update response 932 to the AMF. The update response indicates that the quota has been updated as requested.

When the timer is initialized, it may be initialized to a value that balances the interests of the UE (which would benefit from holding its unit of network quota for a longer period of time) with the interests of the other UEs (which would benefit from the unit of network quota being liberated immediately). In one embodiment, the timer may be initialized to a value in the range from 15 s to 720 s. In another embodiment, the timer may be initialized to a value in the range from 30 s to 360 s. In another embodiment, the timer may be initialized to a value in the range from 60 s to 120 s. Any of a wide variety of values or value ranges may be utilized.

In some embodiments, a method 950 for operating a network node (such as an Access & Mobility Management Function node) may include the operations shown in FIG. 9B. (The method 950 may also include any subset of the elements, embodiments and features described above in connection with FIGS. 1-9A.) The network node may include a processing element configured to perform the method 950. For example, the processing element may perform the method 950 by executing program instructions stored in a memory of the network node. The network node may reside in a core network of a Public Land Mobile Network (PLMN), e.g., a 5G network.

At 955, in response to determining that a user equipment (UE) is to be deregistered at least from a network slice of the network, the processing element may start a timer, and refrain from relinquishing a unit of network slice quota held by the UE (or, on behalf of the UE) while the timer is running.

At 955, in response to receiving, from the UE, a request for registration with the network slice prior to expiration of the timer, the processing element may stop the timer, and send to the UE a registration accept message that indicates the UE is allowed to use the network slice.

In some embodiments, in response determining that the timer has expired and that the UE has not requested registration with the network slice while the timer was running, the processing element may send to the network slice quota node a quota relinquish message relinquishing the unit of network slice quota held by the UE.

In some embodiments, a start value of the timer may be based, at least in part, on an average and a standard deviation of time for UE recovery from temporary anomalous events.

In some embodiments, the processing element may be configured to determine that the UE is to be deregistered from the network by receiving a deregistration request from the UE.

In some embodiments, the processing element may be configured to determine that the UE is to be deregistered from the network by receiving a deregistration message from a second network node of the network.

In some embodiments, the network node is an Access & Mobility Management Function (AMF) node, and the network is a 5G core network.

Figure 10:
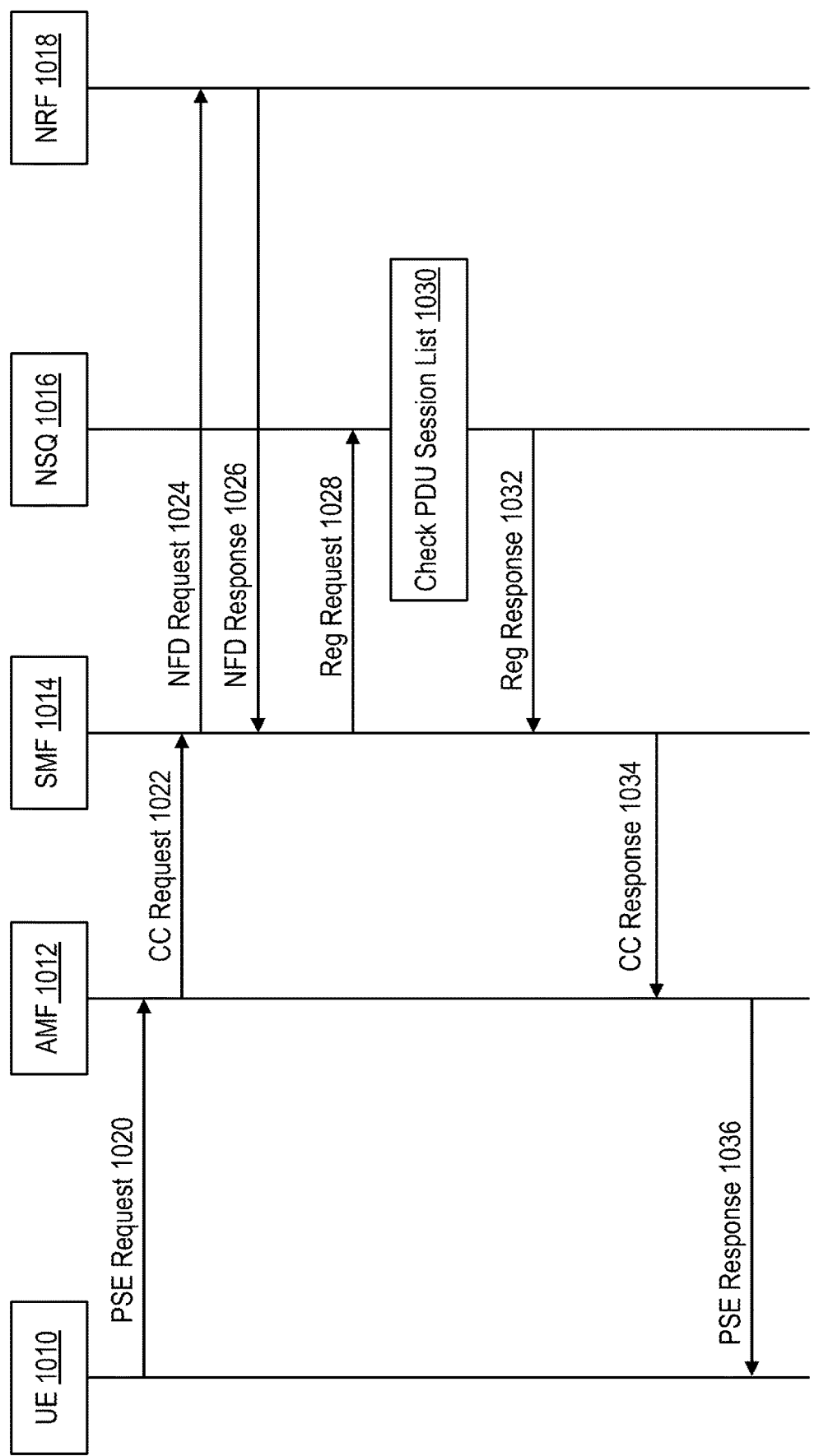
FIG. 10 illustrates a method for PDU session establishment, according to some embodiments.

In some embodiments, a method for PDU session establishment may be performed as shown in FIG. 10. (PDU is an acronym for Protocol Data Unit.) The method may involve a user equipment (1010), an Access & Mobility Management Function (AMF) 1012, a Slice Management Function (SMF) 1014, a Network Slice Quota (NSQ) Function 1016, and Network Repository Function (NRF) 1018.

The UE may send a PDU session establishment (PSE) request 1020 to the AMF. The PSE request represents a request for the establishment of a PDU session on a particular network slice. The PSE request may include the S-NSSAI value of the network slice, and an identification of the PDU session (i.e., a PDU session ID).

In response to receiving the PSE request, the AMF may send a context create (CC) request 1022 to the SMF. The CC request 1022 represents a request for the SMF to create a session management context for the PDU session. The CC request may include the S-NSSAI value of the network slice, and the PDU session ID.

In response to receiving the CC request, the SMF may send a network function discovery (NFD) request 1024 to the network repository function 1018. The NFD request is a request for the network address of (or pointer to) the NSQ. The NFD request may include the S-NSSAI value of the network slice, and a network function type set equal to "NSQ".

In response to receiving the NFD request, the NRF may send an NFD response 1026 to the SMF. The NFD response may include the address/pointer of the NSQ.

In response to receiving the address/pointer of the NSQ, the SMF may send a registration request 1028 to the NSQ. The registration request represents a request for the registration of a PDU session on the network slice. The registration request may include the S-NSSAI value of the network slice, the PDU session ID, and a control mode indicator set equal to "PDU sessions".

In response to receiving the registration request, the NSQ may check a list of registered PDU session IDs on the network slice (as indicated at 1030), to determine whether a maximum allowed number of PDU sessions on the network slice has been reached. If the maximum number has been reached, the NSQ may add the PDU session ID of the registration request to the list, increment a number of registered PDU sessions for the network slice. Otherwise, the NSQ may omit the addition and increment steps.

Depending on the outcome of the check operation 1030, the NSQ may send a registration response 1032 to the SMF indicating whether the registration request is accepted or rejected. (Maximum reached 4 rejection; maximum not reached 4 acceptance). In the case of rejection, the registration response may include a rejection cause field that is set to a value indicating "maximum number of PDU sessions reached" as the cause of rejection.

In response to receiving the registration response 1032, the SMF may create a session management context for the PDU session on the network slice if the state of the registration response is acceptance; and send a context creation (CC) response 1034 to the AMF. The CC response indicates whether the AMF's request for creation of a session management context has been accepted or rejected. In the case of a rejection, the CC response may include a rejection cause field that is set to a value indicating "maximum number of PDU sessions reached" as the cause of rejection. The CC response may also include a back-off timer value for the S-NSSAI value.

In response to receiving the CC response 1034, the AMF may send a PDU session establishment (PSE) response 1036 to the UE. The PSE response indicates whether the UE's request for establishment of a PDU session on the network slice was accepted or rejected. In the case of a rejection, the PSE response may include: a rejection cause field that is set to a value indicating "maximum number of PDU sessions reached" as the cause of rejection; and the back-off timer value for the S-NSSAI value. The back-off timer value indicates a minimum amount of time the UE should wait before sending a PDU session establishment request on the same network slice.

The UE may receive the PSE response from the AMF. If the PSE response indicates acceptance of the request for establishment of a PDU session on the network slice, the UE may start communication under the PDU session of the network slice. If the PSE response indicates rejection, the UE may (if desired) elect to start a back-off timer, with initial value equal to the received back-off timer value, and after the timer expires, send another PSE request with the same PDU session ID and the same S-NSSAI value to the AMF.

As described above, when the SMF sends the registration request 1028 to the NSQ, the SMF may include only the S-NSSAI value and the PDU Session ID in the registration request, and may request the NSQ to feedback an indication of whether quota is available. However, PDU session ID may be the same across different UEs. Thus, there is a risk that a PDU session of a second UE may be rejected since its PDU session ID is identical to the PDU session ID of an existing PDU session, established by a first UE. Furthermore, while entering airplane mode, etc, the UE may not get an opportunity to send an explicit PDU session release command. Thus, the NSQ may have stale quota values for PDU sessions of UEs which are already de-registered. When the UE subsequently tries to establish a PDU session, the NSQ may incorrectly decrement the available quota.

Figure 11:
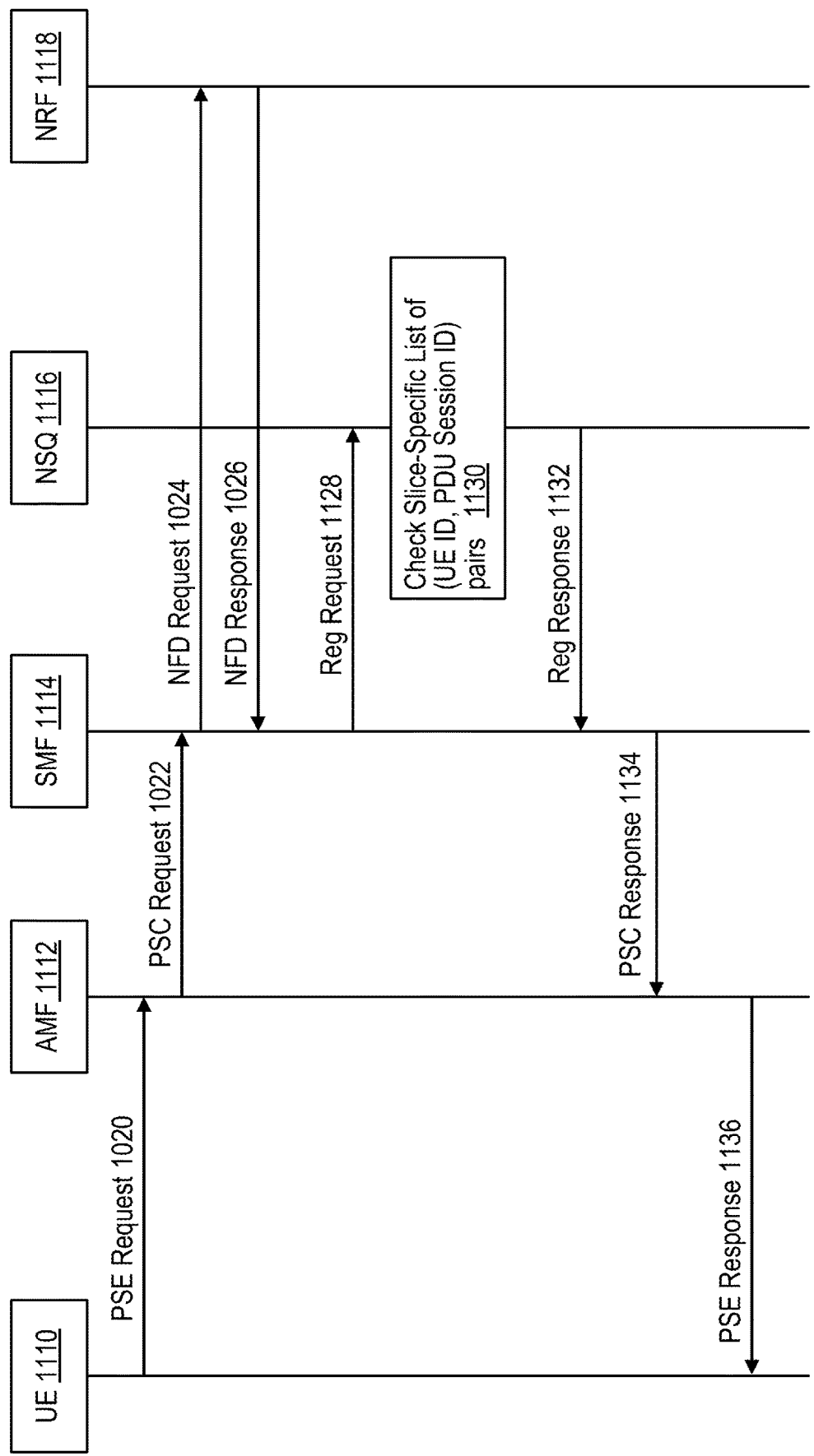
FIG. 11 illustrates a method for PDU session establishment that involves the maintenance of session records, each including a UE identifier and a PDU session identifier, according to some embodiments.

In some embodiments, a method for PDU session establishment may be performed as shown in FIG. 11. (PDU is an acronym for Protocol Data Unit.) The method may involve a user equipment (1110), an Access & Mobility Management Function (AMF) 1112, a Slice Management Function (SMF) 1114, a Network Slice Quota (NSQ) Function 1116, and Network Repository Function (NRF) 1118.

The PSE request 1020, PSC request 1022, NFD request 1024 and NFD response 1026 may be similar to the identically numbered messages described above in the context of FIG. 10. However, registration request 1128 sent by the SMF may include an identification of the UE (i.e., a UE ID) in addition to the S-NSSAI value of the network slice, and the PDU Session ID. Furthermore, the NSQ may maintain a list of the allocated (UE ID, PDU Session ID) combinations, also referred to as "pairs". Thus, the NSQ is able differentiate between identical PDU session IDs associated with different UEs. The NSQ may a separate list for each network slice of the network.

In response to registration request, the NSQ may check the slice-specific list corresponding to the S-NSAAI value (as shown at 1130), to determine whether the requested pair of UE ID and PDU session ID is already on the list. (This check may be referred to as a duplication prevention check.) If so, the NSQ does not add the requested pair to the list, and does not increment the number of registered pairs (or equivalently, does not decrement the available quota). If not, and if the maximum allowed number of registered pairs associated with the S-NSAAI value has not been reached, the NSQ may add the requested pair to the list, and increment the number of registered pairs (or equivalently, decrement the available quota).

Depending on the outcome of the check operation 1130, the NSQ may send a registration response 1132 to the SMF, indicating whether the registration request is accepted or rejected. In the case of rejection, the registration response may include a rejection cause field. The rejection cause field may be set to a value indicating "maximum number of (UE ID, PDU session ID) pairs reached" as the cause of rejection, or be set to a value indicating that the requested (UE ID, PDU session ID) is already present in the list corresponding to the requested S-NSSAI value.

In response to receiving the registration response 1132, the SMF may create a session management context for the PDU session on the network slice if the state of the registration response is acceptance; and send a context creation (CC) response 1134 to the AMF. The CC response indicates whether the AMF's request for creation of a session management context has been accepted or rejected. In the case of a rejection, the CC response may include a rejection cause field set to "maximum reached" or "requested pair already present", as described above. The CC response may also include a back-off timer value for the S-NSSAI value.

In response to receiving the CC response 1134, the AMF may send a PDU session establishment (PSE) response 1136 to the UE. The PSE response indicates whether the UE's request for establishment of a PDU session on the network slice was accepted or rejected. In the case of a rejection, the PSE response may include: a rejection cause field that is set to "maximum reached" or "requested pair already present", as described above; and the back-off timer value for the S-NSSAI value. The back-off timer value indicates a minimum amount of time the UE should wait before sending a PDU session establishment request on the same network slice.

The UE may receive the PSE response 1136 from the AMF. If the PSE response indicates acceptance of the request for establishment of the PDU session on the network slice, the UE may start communication under the PDU session of the network slice. If the PSE response indicates rejection, the UE may (if desired) elect to start a back-off timer, with initial value equal to the received back-off timer value. After the timer expires, the UE may send another PSE request with the same PDU session ID and the same S-NSSAI value to the AMF.

When a UE deregisters from the network, the AMF may inform the NSQ. In response to receiving the AMF's notification of the deregistration, the NSQ may delete all PDU sessions associated with the UE ID of the UE, and accordingly increase the available quota(s) for the one or more network slices that were being used by the UE. For example, if the UE had two PDU sessions on a first network slice, and one PDU session on a second network slice, the available quotas for the first and second slices may be increased by two and one, respectively.

In some embodiments, a method 1200 for operating a network node (such as a Session Management Function node) may include the operations shown in FIG. 12. (The method 1200 may also include any subset of the elements, embodiments and features described above in connection with FIGS. 1-11.) The network node may include a processing element configured to perform the method 1200. For example, the processing element may perform the method 1200 by executing program instructions stored in a memory of the network node. The network node may reside in a core network of a Public Land Mobile Network (PLMN), e.g., a 5G network.

At 1210, the processing element may receive a first request for establishment of a protocol data unit (PDU) session on a network slice of the network. The first request may include an identification of the PDU session, an identification of a user equipment that is requesting said establishment, and an identification of the network slice.

At 1215, in response to receiving said first request, the processing element may search a list of records associated with the network slice, to determine whether the list contains a particular record that includes the UE identification and the PDU session identification of said first request. Each record of the list may include a distinct combination of UE identification and PDU session identification.

At 1220, in response to determining that the list does not contain said particular record and that a maximum number of PDU sessions allowed to use the network slice has not been reached, the processing element may: add a new record to the list, where the new record includes the UE identification and the PDU session identification of the first request; and increment a count of PDU sessions using the network slice.

In some embodiments, the first request may be received from a session management function (SMF) of the network, and the processing element may be configured to send an establishment accept message to the SMF in response adding the new record.

In some embodiments, the network node may maintain a plurality of lists associated with respective network slices of the network. The plurality of lists includes said list associated with the network slice. The processing element may be configured to: receive a deregistration message that indicates the UE is to be deregistered from the network, wherein the deregistration message includes the UE identification of the UE; and in response to receiving the deregistration message, delete, from the lists, any records that include the UE identification of the UE.

In some embodiments, the deregistration message may be received from an Access and Mobility Management Function of the network.

In some embodiments, the processing element may be configured to: receive a deregistration message that indicates the UE is to be deregistered from the network slice, wherein the deregistration message includes the UE identification of the UE and the identification of the network slice; and in response to receiving the deregistration message, delete, from the list, any records that include the UE identification of the UE.

In some embodiments, the processing element may be configured to: after said adding the new record, receiving a second request for establishment that includes the same PDU session identification, UE identification and network slice identification as said first request; and in response to determining that the PDU session ID and UE identification of the second request are present in a record of the list associated with the network slice, refraining from adding another record to the list.

In various embodiments disclosed herein, a user equipment is referred to as sending messages to or receive messages from an Access and Mobility Function (AMF) of a PLMN. It is understood that those message may be sent via a wireless base station of the PLMN, e.g., via a gNB conforming to the 3GPP 5G standard, or a wireless access point of a 5G Non-3GPP standard (such as WiFi).

In some embodiments, a network node in a network comprises a processing element configured to perform the following operations.

The processing element may be configured to receive a first request for establishment of a protocol data unit (PDU) session on a network slice of the network, wherein the first request includes an identification of the PDU session, an identification of a user equipment that is requesting said establishment, and an identification of the network slice.

In response to receiving said first request, the processing element may be configured to search a list of records associated with the network slice, to determine whether the list contains a particular record that includes the UE identification and the PDU session identification of said first request, wherein each record of the list includes a distinct combination of UE identification and PDU session identification.

In response to determining that the list does not contain said particular record and that a maximum number of PDU sessions allowed to use the network slice has not been reached, the processing element may be configured to add a new record to the list, wherein the new record includes the UE identification and the PDU session identification of the first request, and increment a count of PDU sessions using the network slice.

In some embodiments, the first request is received from a session management function (SMF) of the network, and the processing element is configured to: in response adding the new record, send an establishment accept message to the SMF.

In some embodiments, the network node maintains a plurality of lists associated with respective network slices of the network, wherein the plurality of lists includes said list associated with the network slice. In these embodiments, the processing element may be configured to: receive a deregistration message that indicates the UE is to be deregistered from the network, wherein the deregistration message includes the UE identification of the UE; and in response to receiving the deregistration message, delete, from the lists, any records that include the UE identification of the UE.

In some embodiments, the deregistration message is received from an Access and Mobility Management Function of the network.

In some embodiments, the processing element may be configured to: receive a deregistration message that indicates the UE is to be deregistered from the network slice, wherein the deregistration message includes the UE identification of the UE and the identification of the network slice; and in response to receiving the deregistration message, delete, from the list, any records that include the UE identification of the UE.

In some embodiments, the processing element may be configured to: after said adding the new record, receive a second request for establishment that includes the same PDU session identification, UE identification and network slice identification as said first request; and in response to determining that the PDU session identification and UE identification of the second request are present in a record of the list associated with the network slice, refrain from adding another record to the list.

In some embodiments, the network may be a 3GPP 5G core network.

In some embodiments, a network node comprises a processing element configured to perform the following operations.

In response to receiving, from a user equipment (UE), a request for registration to use a network slice, the processing element may be configured to send a query message to a network slice quota (NSQ) node, wherein the query message represents an inquiry on whether there is available quota for an addition of the UE to a number of user equipments using the network slice.

In response to receiving, from the NSQ node, a positive response to the query message, the processing element may be configured to preemptively claim a unit of network slice quota for the UE prior to initiation of a procedure to authenticate and/or authorize the UE to use the network slice, wherein said preemptively claiming includes sending to the NSQ node a request for the NSQ to update the available quota for the network slice.

In some embodiments, the processing element may be configured to: in response to receiving from the NSQ node a confirmation that the available quota for the network slice has been updated, initiate said procedure to authenticate and/or authorize the UE to use the network slice; and in response to receiving an indication that the procedure has successfully authenticated and/or authorized the UE to use the network slice, send a registration accept message to the UE, indicating that the UE is allowed to use the network slice.

In some embodiments, the processing element may be configured to: in response to receiving from the NSQ node a confirmation that the available quota has been updated, initiate said procedure to authenticate and/or authorize the UE to use the network slice; and in response to receiving an indication that the procedure has failed to authenticate and/or authorize the UE to use the network slice, send a registration reject message to the UE, indicating that the UE is not allowed to use the network slice.

In some embodiments, the processing element may be configured to: in response to receiving, from the NSQ node, a negative response to the query message, send, to the UE, a registration reject message, indicating that the UE is not allowed to use the network slice.

In some embodiments, the network node may be an Access & Mobility Management Function (AMF) node of a 3GPP 5G core network.

In some embodiments, a network node in a network comprises a processing element configured to performing the following operations.

The processing element may be configured to initiate a process of authenticating and/or authorizing a first user equipment (UE) to use a network slice of the network.

In response to receiving an indication that the process has successfully authenticated and/or authorized the first UE to use the network slice, the processing element may be configured to send a query message to a network slice quota node, wherein the query message represents an inquiry on whether there is available quota for an addition of the first UE to a number of user equipments using the network slice.

In response to receiving a positive response to the query message, the processing element may be configured to send a quota update message that requests the network slice quota node to update the available quota.

In response to receiving a confirmation message that the available quota has been updated based on said quota update message, the processing element may be configured to send a registration accept message to the first UE, indicating that the first UE is authorized to use the network slice.

In some embodiments, the processing element may be configured to perform said initiating in response to: receiving, from the first UE, a request for access to the network slice; determining that the network slice is subject to authentication and/or authorization; based on the request for access, sending a preliminary query, to the network slice quota node, representing an inquiry on whether there is available quota for an addition of the first UE to a number of user equipments using the network slice; and receiving a positive response to the preliminary query.

In some embodiments, the processing element may be configured to initiate the process by sending an initiation message to an authentication and authorization server in the network or external to the network.

In some embodiments, the network may be a 3GPP 5G core network, and the network node may implement an Access and Mobility Management Function (AMF).

In some embodiments, the processing element may be configured to send the registration accept message to the UE via a wireless base station of the network.

In some embodiments, the network node may further comprise a network interface configured to interface with the network.

In some embodiments, a network node in a network may comprise a processing element configured to perform the following operations.

In response to determining that a user equipment (UE) is to be deregistered at least from a network slice of the network, the processing element may be configured to start a timer, and refrain from relinquishing a unit of network slice quota held by the UE while the timer is running.

In response to receiving, from the UE, a request for registration with the network slice prior to expiration of the timer, the processing element may be configured to stop the timer, and send to the UE a registration accept message that indicates the UE is allowed to use the network slice.

In some embodiment, the processing element may be configured to: in response determining that the timer has expired and that the UE has not requested registration with the network slice while the timer was running, send to the network slice quota node a quota relinquish message relinquishing the unit of network slice quota held by the UE.

In some embodiments, a start value of the timer is based, at least in part, on an average and a standard deviation of time for UE recovery from temporary anomalous events.

In some embodiments, the processing element may be configured to determine that the UE is to be deregistered from the network by receiving a deregistration request from the UE.

In some embodiments, the processing element may be configured to determine that the UE is to be deregistered from the network by receiving a deregistration message from a second network node of the network.

In some embodiments, the network node may be an Access & Mobility Management Function (AMF) node, and the network may be a 5G core network.

Embodiments of the present disclosure may be realized in any of various forms. For example, some embodiments may be realized as a computer-implemented method, a computer-readable memory medium, or a device. Other embodiments may be realized using one or more custom-designed hardware devices such as ASICs. Still other embodiments may be realized using one or more programmable hardware elements such as FPGAs.

Some embodiments may include a device, comprising: an antenna; a radio coupled to the antenna; and a processing element operably coupled to the radio, wherein the device is configured to implement any or all parts of the preceding examples.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Yet another exemplary embodiment may include an apparatus comprising means for performing any or all of the elements of any of the preceding examples.

Still another exemplary embodiment may include an apparatus comprising a processing element configured to cause a device to perform any or all of the elements of any of the preceding examples.

Any of the methods described herein for operating a user equipment (UE) in communication with a base station may be the basis of a corresponding method for operating a base station, by interpreting each message/signal X received by the UE in the downlink as a message/signal X transmitted by the base station, and each message/signal Y transmitted in the uplink by the UE as a message/signal Y received by the base station.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A plurality of network nodes in a network, the plurality of network nodes comprising:
   a session management function (SMF) configured to:
      request an address of a network slice quota (NSQ) node; and
      in response to receiving the address of the NSQ node, send to the NSQ node a first request for establishment of a protocol data unit (PDU) session on a network slice of the network, wherein the first request includes an identification of the PDU session, an identification of a user equipment (UE) that is requesting said establishment, and an identification of the network slice; and
   the NSQ node, configured to:
      in response to receiving said first request, determine whether a maximum number of PDU sessions allowed to use the network slice has been reached; and
      in response to determining that the maximum number of PDU sessions allowed to use the network slice has not been reached, add a new record to list of records of UE identifications and PDU session identifications associated with the network slice, wherein the new record corresponds to the UE identification and the PDU session identification of the first request, and increment a count of PDU sessions using the network slice.

2. The plurality of network nodes of claim 1, wherein the NSQ node is configured to:
   in response adding the new record, send an establishment accept message to the SMF.

3. The plurality of network nodes of claim 1, wherein the NSQ node maintains a plurality of lists associated with respective network slices of the network, wherein the plurality of lists includes said list associated with the network slice, wherein the NSQ node is configured to:
   receive a deregistration message that indicates the UE is to be deregistered from the network, wherein the deregistration message includes the UE identification of the UE; and
   in response to receiving the deregistration message, delete, from the lists, any records that include the UE identification of the UE.

4. The plurality of network nodes of claim 3, wherein the deregistration message is received from an Access and Mobility Management Function of the network.

5. The plurality of network nodes of claim 1, wherein the NSQ node is configured to:
receive a deregistration message that indicates the UE is to be deregistered from the network slice, wherein the deregistration message includes the UE identification of the UE and the identification of the network slice; and
in response to receiving the deregistration message, delete, from the list, any records that include the UE identification of the UE.

6. The plurality of network nodes of claim 1, wherein the NSQ node is configured to:
after said adding the new record, receive a second request for establishment that includes the same PDU session identification, UE identification and network slice identification as said first request; and
in response to determining that the maximum number of PDU sessions allowed to use the network slice has been reached, refrain from adding another record to the list.

7. The plurality of network nodes of claim 1, wherein the network is a 3GPP 5G core network.

8. The plurality of network nodes of claim 1, further comprising:
a memory configured to store the list of records.

9. A method comprising:
by a first node of a network:
requesting an address of a network slice management node of the network; and
in response to receiving the address of the network slice management node, sending a first request for establishment of a protocol data unit (PDU) session on a network slice of a network, wherein the first request includes an identification of the PDU session, an identification of a user equipment (UE) that is requesting said establishment, and an identification of the network slice; and
by the network slice management node:
in response to receiving the first request, determine whether a maximum number of PDU sessions allowed to use the network slice has been reached; and
in response to determining that the maximum number of PDU sessions allowed to use the network slice has not been reached, add a new record to a list of records of UE identifications and PDU session identifications associated with the network slice, wherein the new record corresponds to the UE identification and the PDU session identification of the first request, and increment a count of PDU sessions using the network slice.

10. The method of claim 9, the method further comprising:
in response adding the new record, send an establishment accept message to the first node.

11. The method of claim 9, further comprising:
maintaining a plurality of lists associated with respective network slices of the network, wherein the plurality of lists includes said list associated with the network slice;
receiving a deregistration message that indicates the UE is to be deregistered from the network, wherein the deregistration message includes the UE identification of the UE; and
in response to receiving the deregistration message, deleting, from the lists, any records that include the UE identification of the UE.

12. The method of claim 11, wherein the deregistration message is received from an Access and Mobility Management Function of the network.

13. The method of claim 9, further comprising:
receiving a deregistration message that indicates the UE is to be deregistered from the network slice, wherein the deregistration message includes the UE identification of the UE and the identification of the network slice; and
in response to receiving the deregistration message, deleting, from the list, any records that include the UE identification of the UE.

14. The method of claim 9, further comprising:
by the network slice management node:
after said adding the new record, receiving a second request for establishment that includes the same PDU session identification, UE identification and network slice identification as said first request; and
in response to determining that the maximum number of PDU sessions allowed to use the network slice has been reached, refraining from adding another record to the list.

15. The method of claim 9, wherein the network is a 3GPP 5G core network.

16. A wireless communication network comprising:
a first node configured to:
receive a request to create a session management context for a protocol data unit (PDU) session on a network slice of the wireless communication network;
in response to receiving the request to create the session management context, provide a request for an address of a second node of the wireless communication network; and
in response to receiving the address, provide a first request for establishment of the PDU session on the network slice of a network, wherein the first request includes an identification of the PDU session, an identification of a user equipment (UE) that is requesting the establishment, and an identification of the network slice; and
the second node configured to:
in response to receiving the first request, determine whether a maximum number of PDU sessions allowed to use the network slice has been reached; and
in response to determining that a maximum number of PDU sessions allowed to use the network slice has not been reached, add a new record to a list of records of UE identifications and PDU session identifications associated with the network slice, wherein the new record corresponds to the UE identification and the PDU session identification of the first request, and increment a count of PDU sessions using the network slice.

17. The wireless communication network of claim 16, wherein the second node is configured to:
in response adding the new record, send an establishment accept message to the first node.

18. The wireless communication network of claim 16, wherein the second node is configured to:
maintain a plurality of lists associated with respective network slices of the wireless communication network, wherein the plurality of lists includes said list associated with the network slice;
receive a deregistration message that indicates the UE is to be deregistered from the wireless communication network, wherein the deregistration message includes the UE identification of the UE; and in response to receiving the deregistration message, delete, from the lists, any records that include the UE identification of the UE.

19. The wireless communication network of claim 16, wherein the second node is configured to:

receive a deregistration message that indicates the UE is to be deregistered from the network slice, wherein the deregistration message includes the UE identification of the UE and the identification of the network slice; and in response to receiving the deregistration message, delete, from the list, any records that include the UE identification of the UE.

20. The wireless communication network of claim 16, wherein the second node is configured to:

after said adding the new record, receive a second request for establishment that includes the same PDU session identification, UE identification and network slice identification as said first request; and in response to determining that the maximum number of PDU sessions allowed to use the network slice has been reached, refrain from adding another record to the list.

* * * * *